(12) United States Patent
Ezoe et al.

(10) Patent No.: US 9,493,163 B2
(45) Date of Patent: Nov. 15, 2016

(54) DRIVING SUPPORT APPARATUS FOR VEHICLE

(71) Applicant: Fuji Jukogyo Kabushiki Kaisha, Tokyo (JP)

(72) Inventors: Shiro Ezoe, Tokyo (JP); Takayuki Nagase, Tokyo (JP); Osamu Takahashi, Tokyo (JP); Koji Matsuno, Tokyo (JP); Harunobu Horiguchi, Tokyo (JP); Masato Mizoguchi, Tokyo (JP); Yasushi Takaso, Tokyo (JP); Hajime Oyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/738,853

(22) Filed: Jun. 13, 2015

(65) Prior Publication Data
US 2015/0367854 A1  Dec. 24, 2015

(30) Foreign Application Priority Data

Jun. 23, 2014 (JP) ................... 2014-128539

(51) Int. Cl.
*G05D 1/00* (2006.01)
*B60W 30/18* (2012.01)

(52) U.S. Cl.
CPC ................ *B60W 30/18163* (2013.01)

(58) Field of Classification Search
CPC ............... B60W 30/18163; G06G 7/78; G05D 1/12; G01S 2013/9385
See application file for complete search history.

(56) References Cited

U.S. PATENT DOCUMENTS 9,063,548 B1 * 6/2015 Ferguson ............. G05D 1/0231
2007/0222639 A1 * 9/2007 Giles ........................ G08G 1/07
340/907

(Continued)

FOREIGN PATENT DOCUMENTS

JP    H 01-298500 A    12/1989
JP    2000-067394 A    3/2000

(Continued)

OTHER PUBLICATIONS

JPO Decision to Grant a Patent dated May 17, 2016.
JPO Notification of Reason for Refusal dated Jan. 5, 2016.

*Primary Examiner* — Mary Cheung
(74) *Attorney, Agent, or Firm* — McGinn IP Law Group, PLLC

(57) ABSTRACT

When an oncoming vehicle in an oncoming lane is detected in the case where a vehicle equipped with a driving support apparatus moves to a position across a portion of a boundary between an original traveling lane of the vehicle and the oncoming lane in order to pass a preceding vehicle, passing control is interrupted. When the departure of the oncoming vehicle from the oncoming lane is confirmed, the interruption of the passing control is canceled and the passing is performed. When the oncoming vehicle does not depart, or when it the oncoming vehicle is determined to depart but a vehicle following the oncoming vehicle is detected, the interruption of the passing control is maintained and the vehicle is returned to behind the preceding vehicle in the original traveling lane.

12 Claims, 3 Drawing Sheets

(56) References Cited

U.S. PATENT DOCUMENTS

| | | | |
|---|---|---|---|
| 2008/0309517 A1* | 12/2008 | Saito | B60R 1/00 340/937 |
| 2009/0164109 A1* | 6/2009 | Maruyama | B60W 30/16 701/116 |
| 2010/0305804 A1* | 12/2010 | Taguchi | G06F 7/00 701/31.4 |
| 2011/0313665 A1 | 12/2011 | Lueke et al. | |
| 2015/0224987 A1* | 8/2015 | Tachibana | G08G 1/166 701/1 |
| 2015/0356869 A1* | 12/2015 | Young | G08G 1/0133 340/901 |

FOREIGN PATENT DOCUMENTS

| | | |
|---|---|---|
| JP | 2009-248892 A | 10/2009 |
| JP | 2012-519346 A | 8/2012 |
| WO | WO 2010/099789 A1 | 9/2010 |

* cited by examiner

DRIVING SUPPORT APPARATUS FOR VEHICLE

CROSS-REFERENCE TO RELATED APPLICATIONS

The present application claims priority from Japanese Patent Application No. 2014-128539 filed on Jun. 23, 2014, the entire contents of which are hereby incorporated by reference.

BACKGROUND

1. Technical Field

The present invention relates to a driving support apparatus for a vehicle that enables passing control relating to a preceding vehicle that travels in front of the vehicle.

2. Related Art

In recent years, a variety of support apparatuses for vehicles such as automobiles have been developed and put to practical use, the apparatuses using a camera or a radar device installed on the vehicle to recognize the traveling environment around the vehicle and reduce operational load on the driver. A system disclosed in Japanese Unexamined Patent Application Publication (JP-A) No. 2009-248892 is an example of such a driving support apparatus. In the system, when the speed of the preceding vehicle is lower than the set speed of the vehicle equipped with the driving support apparatus, it is determined whether or not the vehicle can pass the preceding vehicle on the basis of the traveling position of the vehicle and traffic information, and, when it is determined that the passing is possible, the vehicle is caused to pass the preceding vehicle by automatic driving.

In JP-A No. 2009-248892, whether or not the preceding vehicle can be passed is determined in advance, and a passing preparation operation is performed when it is determined that passing is possible, thereby enabling automatic passing without frightening or giving discomfort to the driver of the vehicle or drivers of the surrounding vehicles, but no particular attention is paid to changes in the surrounding conditions after the passing has been started.

Thus, depending on the change in conditions after the passing of the preceding vehicle has been started, it may be necessary to terminate the passing or the passing can be safely completed. In either case, driving support is needed that gives no anxiety to the driver.

SUMMARY OF THE INVENTION

The present invention has been designed in consideration of the circumstances described above, and an object thereof is to provide a driving support apparatus for a vehicle that adequately determines, according to the surrounding conditions, whether to interrupt or execute the passing after the passing of the preceding vehicle has been started, and causes no anxiety to the drivers.

An aspect of the present invention provides a driving support apparatus for a vehicle that determines whether or not the vehicle can pass a preceding vehicle traveling in front of the vehicle and executes passing control relating to the preceding vehicle when the passing is possible, the driving support apparatus including: an oncoming lane status detection module that detects a status of at least one vehicle traveling in an oncoming lane when the vehicle moves to the oncoming lane and the passing control relating to the preceding vehicle is started; and a passing control interruption determination module that interrupts the passing control relating to the preceding vehicle when an oncoming vehicle is detected by the oncoming lane status detection module and determines whether to continue the passing control relating to the preceding vehicle or to maintain the interruption according to the status of the at least vehicle traveling in the oncoming lane.

DETAILED DESCRIPTION

An example of the present invention will be described hereinbelow with reference to the drawings.

Figure 1:
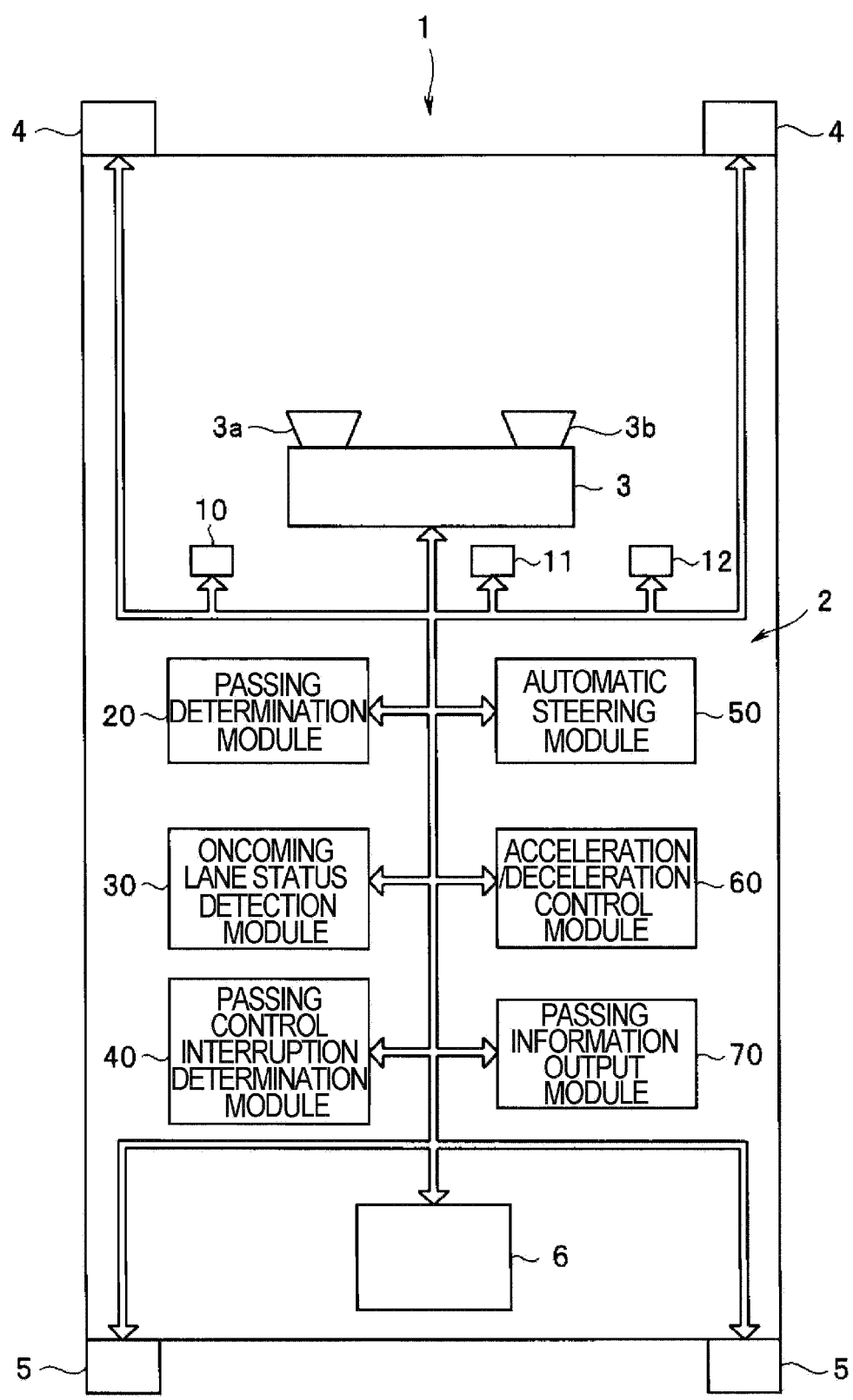
FIG. 1 is a schematic diagram of a driving support apparatus for a vehicle according to an example of the present invention.

In FIG. 1, the reference numeral 1 denotes a vehicle such as an automobile (hereinafter also referred to as "subject vehicle"). The subject vehicle 1 includes a driving support apparatus 2 that performs driving support control including automatic driving that is independent of the driving operation performed by the driver. The driving support apparatus 2 is provided with an external environment recognition unit constituted by various devices recognizing the surrounding external environment around the subject vehicle 1, and receives signals from a variety of sensors detecting the driving state of the subject vehicle 1.

In the example, the driving support apparatus 2 is equipped with a stereo camera unit 3 that detects three-dimensional positions of objects in front of the vehicle 1, side radar units 4 that detect objects in front and on the sides of the vehicle 1, and rearward radar units 5 that detect objects behind the vehicle 1 with microwaves or the like, as devices for sensing the external environment. In addition, the driving support apparatus is equipped with a traffic information communication unit 6 that acquires traffic information by infra communication such as road-vehicle communication and vehicle-vehicle communication. The units 4 to 6 constitute the external environment recognition unit that recognizes the external environment of the vehicle 1.

The stereo camera unit 3 mainly includes two, left and right, cameras 3a and 3b disposed close to a room mirror on the inner side of a front window in the upper portion of a vehicle cabin. The left and right cameras 3a and 3b are shutter-synchronized cameras having imaging elements such as CCD or CMOS and are secured at a predetermined base length. An image processing unit that performs stereo image processing of a pair of images captured by the left and right cameras 3a and 3b and acquires three-dimensional position information in the actual space of an object in front, such as a preceding vehicle, is provided integrally with the stereo camera unit 3. The three-dimensional position of the object is obtained by converting image coordinate values and parallax data on the object obtained by the stereo image processing into coordinate values in a three-dimensional space that takes, for example, the road surface directly below the center of the stereo camera as an origin point, a lateral direction of the vehicle as an X axis, a height direction of the vehicle as an Y axis, and a longitudinal direction of the vehicle (distance direction) as a Z axis.

The side radar units 4 are short-range radars detecting objects that are present around the subject vehicle at a comparatively short distance therefrom. For example, the side radar units 4 are disposed in the left and right corner of a front bumper, transmit radar waves such as microwaves and high-band milliwaves to the outside, receive waves reflected from the objects, and measure the distance to or azimuth of the objects that are positioned in front and on the front sides of the subject vehicle and outside of the field of view of the stereo camera unit 3. Further, the rearward radar units 5 are disposed, for example, at the left and right corner portions of a rear bumper, likewise transmit radar waves to the outside, receive waves reflected from the objects, and measure the distance to or azimuth of the objects positioned behind and on the rear sides of the subject vehicle.

The objects located behind the subject vehicle may be detected by image recognition using a rearview camera, or by sensor fusion of image recognition with another sensing device.

The traffic information communication unit 6 acquires traffic information such as intersections or areas that cannot be seen (cannot be sensed) by the stereo camera unit 3, the side radar units 4, and the rearward radar units 5 through road-vehicle communication using equipment installed on the road or vehicle-vehicle communication with other vehicles. The traffic information communication unit 6 may be a dedicated device, and also may use a communication device provided at a positioning device, such as a navigation device, that holds map information on the traveling environment such as positions of intersections and traffic lights, the number of lanes on the road, the curvature radius of the road, the speed limit, and passing prohibition intervals.

Meanwhile, the sensors which detect the driving state of the subject vehicle 1 include a vehicle speed sensor 10 that detects the vehicle speed, a steering angle sensor 11 that detects a steering angle, and a G sensor 12 that detects an acceleration. The driving support apparatus 2 performs driving support control of the vehicle 1 on the basis of information on the traffic environment around the subject vehicle 1 which is acquired by the units 4 to 6, and the driving state information on the subject vehicle 1 which is detected by various sensors such as the vehicle speed sensor 10, the steering angle sensor 11, and the G sensor 12.

The driving support control performed by the driving support apparatus 2 includes adaptive cruise control (ACC) relating to the preceding vehicle as one of the main functions, and passing control relating to the preceding vehicle that is a function associated with the ACC control. In the passing control performed by the driving support apparatus 2, in the case where a preceding vehicle is recognized in front of the subject vehicle and the speed of the preceding vehicle is lower than the set speed of the subject vehicle, it is determined whether or not the subject vehicle can pass the preceding vehicle, on the basis of the traveling position of the subject vehicle, the speed of the subject vehicle relative to the preceding vehicle, and traffic information on the surroundings of the subject vehicle. When it is determined that the passing is possible, the passing of the preceding vehicle is executed with automatic steering.

The passing control performed by the driving support apparatus 2 is described hereinbelow. The objective of the passing control herein is to move the subject vehicle from the original traveling lane into the oncoming lane in order to pass the preceding vehicle and then return the subject vehicle to the original traveling lane (move the subject vehicle in front of the preceding vehicle) after passing the preceding vehicle. The driving support apparatus 2 is provided with a passing determination module 20, an oncoming lane status detection module 30, a passing control interruption determination module 40, an automatic steering module 50, an acceleration/deceleration control module 60, and a passing information output module 70 as functional modules relating to the passing control performed with the above-described objective.

The passing determination module 20 uses the status of the white line (lane line) on the road that is recognized by the stereo camera unit 3 and the traffic information acquired through the traffic information communication unit 6 to determine whether or not to pass the preceding vehicle when the subject vehicle is to reach the preceding vehicle that travels at a speed lower than that of the subject vehicle or when the preceding vehicle decelerates. The determination is made based on the assumption that the current traveling interval is not a passing prohibited interval and that there are no obstacles for passing, such as construction, accidents, toll booths, traffic lights, and intersections.

Whether to perform the passing is determined on the basis of the travel speed of the subject vehicle, the relative speed of the subject vehicle and the preceding vehicle, and the distance between the subject vehicle and the preceding vehicle and other information that are acquired from the outputs of the stereo camera unit 3 and the vehicle speed sensor 10, and the presence/absence of a following vehicle in the oncoming lane behind the subject vehicle that is acquired from the output of the rearward radar units 5. For example, when no following vehicle is approaching the subject vehicle in the oncoming lane behind the subject vehicle and also the difference between the set speed and actual traveling speed of the subject vehicle is equal to or greater than a predetermined value and the distance between the vehicles is less than a predetermined distance, it is determined that appropriate passing of the preceding vehicle is possible and an instruction to start the passing control is issued to the automatic steering module 50 and the acceleration/deceleration control module 60.

When the difference in traveling speed between the subject vehicle and the preceding vehicle has become extremely large (for example, when emergency braking has been performed in the preceding vehicle), the collision preventing control is preferentially performed without the passing determination to avoid the collision between the subject vehicle and the preceding vehicle.

In response to the passing determination made by the passing determination module 20, the oncoming lane status detection module 30 starts an operation of moving the subject vehicle from the original traveling lane to the oncoming lane, and detects the status of vehicles traveling in the oncoming lane, such as an oncoming vehicle that faces the subject vehicle and a following vehicle that is behind the oncoming vehicle, as the subject vehicle moves across the original traveling lane and into the oncoming lane. More specifically, when the oncoming vehicle is detected, the status of the oncoming vehicle, such as the speed, lateral position, and operation state of turn signal lamps thereof, is monitored. The lateral position of the oncoming vehicle is calculated, for example, as a distance in the X-axis direction (lateral direction of the vehicle) relative to the white line (lane line) of the road recognized from the captured image in an XYZ coordinate space having the subject vehicle (stereo camera unit 3) as a point of origin.

The detection of the white lane can be performed by estimating changes in brightness in the lateral direction of the road in the image plane of the image captured by the stereo camera unit 3, extracting a group of points serving as candidates for the white line, processing the time-series data on the spatial coordinate positions of the white line candidate points, and using a model approximating a white line shape. An approximation model in which linear components obtained by Hough transform are linked, or a model with approximation by a curve, such as a second order curve, can be used as the white line approximation model.

The passing control interruption determination module 40 examines whether or not an oncoming vehicle has been detected in the oncoming lane on the basis of information inputted from the oncoming lane status detection module 30 when the passing control is started to determine whether or not to interrupt the passing control. The passing control is maintained when no oncoming vehicle is detected in the oncoming lane, and the passing control is interrupted when an oncoming vehicle has been detected in the oncoming lane. After the passing control has been interrupted, it is determined whether to cancel the interruption and perform the passing or to maintain the passing control interruption, according to the status of vehicles in the oncoming lane. In the example, in the case where the interruption is not canceled, the passing control is terminated and the subject vehicle is returned to the original traveling lane.

Figure 2:
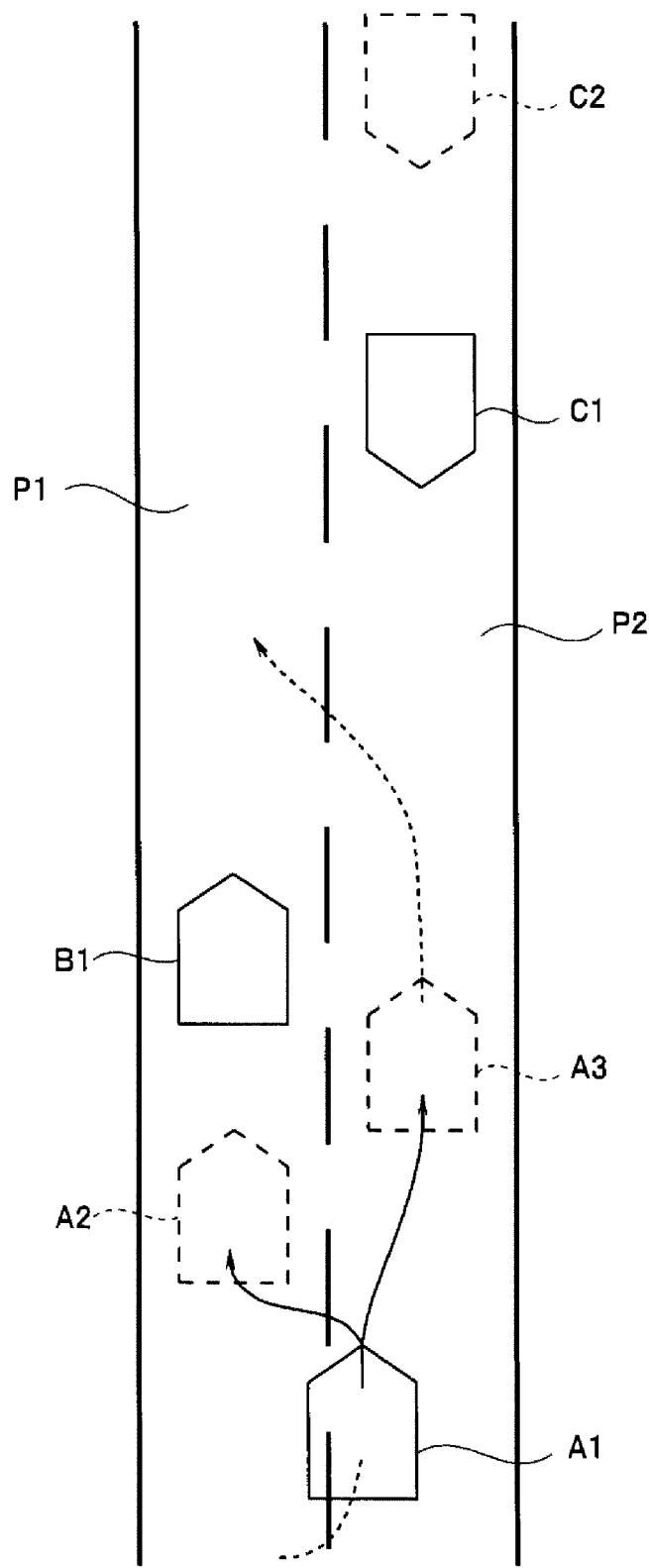
FIG. 2 illustrates the position of a vehicle after passing has been started.

More specifically, referring to FIG. 2, in the case where an oncoming vehicle C1 is detected in an oncoming lane P2 when the subject vehicle moves to a position A1 across the boundary portion of an original traveling lane P1 and the oncoming lane P2 in order to pass a preceding vehicle B1, the passing control is interrupted. Then, it is determined whether to cancel the interruption of the passing control and perform the passing or to maintain the interruption of the passing control, according to the conditions (1) to (3) described hereinbelow, and the determination result is output to the automatic steering module 50 and the acceleration/deceleration control module 60.

(1) The Oncoming Vehicle is Determined not to Depart from the Lane

It is determined whether or not the oncoming vehicle departs from the oncoming lane to turn into a branch road or enter a facility along the road. In the case where the oncoming vehicle is determined not to depart, the interruption of the passing control is maintained, and the automatic steering module 50 and the acceleration/deceleration control module 60 are instructed to return the subject vehicle into the original traveling lane. Thus, when the oncoming vehicle C1 is determined not to depart at the position A1 depicted in FIG. 2, the passing of the preceding vehicle B1 is terminated, and the subject vehicle is returned to the original traveling lane P1 and to the position A2 behind the preceding vehicle B1.

Whether or not the oncoming vehicle departs is determined using a departure determination value based on the lateral position of the oncoming vehicle. When the departure determination value is equal to or less than a threshold, the oncoming vehicle is determined not to depart and the passing control is interrupted. Meanwhile, when the departure determination value exceeds the threshold, the oncoming vehicle is determined to depart and whether to interrupt/cancel the passing control is determined according to whether or not there is a following vehicle behind the oncoming vehicle.

The departure determination value is a parameter calculated from the variation amount of the lateral position of the oncoming vehicle per a predetermined time. For example, a lateral speed Vx, a lateral acceleration Gx, a yaw angle θ, and a yaw rate γ may be used as such a parameter. When the passing control is interrupted because the oncoming vehicle has appeared, the passing control interruption determination module 40 examines a change in the behavior of the oncoming vehicle by comparing any of those parameters or a plurality of such parameters with respective thresholds and determines that the oncoming vehicle departs when any of the lateral speed Vx, lateral acceleration Gx, yaw angle θ, and yaw rate γ, or a plurality thereof exceeds the respective thresholds.

Each threshold is set, for example, by referring to a map based on the distance between the subject vehicle and preceding vehicle and the relative speed thereof, and then is variably changed according to a vehicle speed variation degree and the relationship between the speed of the subject vehicle and the speed limit. For example, the threshold for departure determination is increased further as the change speed of the oncoming vehicle becomes larger, and as the speed of the subject vehicle becomes closer to the speed limit, whereby a safer determination is made. These thresholds are decreased by a set value in the case the turn signal lamps of the oncoming vehicle are recognized to be blinking.

As for the vehicle speed that is used for determining whether or not the passing is safely made, the margin time that ensures safety is calculated under a condition that the acceleration can be performed only up to a speed limit, and the determination may be made based thereon.

(2) A Following Vehicle is Detected Behind the Oncoming Vehicle after the Departure of the Oncoming Vehicle is Confirmed Even when the departure of the oncoming vehicle is confirmed by using the above-described departure determination value, the interruption of the passing control is maintained and the automatic steering module 50 and the acceleration/deceleration control module 60 are instructed to return the subject vehicle to the original traveling lane, in the case where a following vehicle traveling behind the oncoming vehicle is detected. Thus, referring to FIG. 2, when the departure of the oncoming vehicle C1 has been confirmed at the position A1 depicted and then a following vehicle C2 is detected behind the oncoming vehicle C1, the passing of the preceding vehicle B1 is terminated and the subject vehicle is caused to returns to the original traveling lane P1 and moves to the position A2 after the preceding vehicle B1.

(3) A Following Vehicle is not Detected Behind the Oncoming Vehicle after the Departure of the Oncoming Vehicle is Confirmed In the case where a following vehicle that travels behind the oncoming vehicle is not detected after the departure of the oncoming vehicle has been confirmed by the above-described departure determination value, the interruption of the passing control due to the appearance of the oncoming vehicle is canceled and the passing control performed by the automatic steering module 50 and the acceleration/deceleration control module 60 is continued. In this case, referring to FIG. 2, the subject vehicle moves from the position A1 to the position A3 inside the oncoming lane P2, as depicted in FIG. 2, passes the preceding vehicle B1, and then returns to the original traveling lane P1 in front of the preceding vehicle B1, thereby completing the passing.

In response to an instruction to start the passing control from the passing determination module 20, the passing control performed by the automatic steering module 50 and the acceleration/deceleration control module 60 blink a turn light lamp with the automatic steering module 50, and control a power steering device (not illustrated in the figure) to move the subject vehicle from the original traveling lane into the oncoming lane. Further, the acceleration/deceleration control module 60 controls an electronic throttle device (not illustrated in the figure) and moves the subject vehicle into the oncoming lane while accelerating the subject vehicle.

In this case, if an oncoming vehicle is not detected in the oncoming lane and an instruction to interrupt the passing control is not output from the passing control interruption determination module 40, the acceleration of the subject vehicle is increased after the subject vehicle has moved into the oncoming lane, to pass the preceding vehicle. When the distance to the preceding vehicle becomes adequate, the subject vehicle is returned to the original traveling lane and positioned in front of the preceding vehicle, thereby completing the passing control.

On the other hand, in the case where an oncoming vehicle is detected in the oncoming lane when the subject vehicle moves across the original traveling lane and the passing control interruption determination module 40 instructs to interrupt the passing, the movement of the subject vehicle into the oncoming lane is interrupted. When the interruption of the passing control is thereafter canceled because the departure of the oncoming vehicle is confirmed by the passing control interruption determination module 40 and no following vehicle is detected, the subject vehicle is moved into the oncoming lane and the acceleration of the subject vehicle is increased to pass the preceding vehicle. Once the distance to the preceding vehicle becomes adequate, the subject vehicle is returned to the original traveling lane and positioned in front of the preceding vehicle, thereby completing the passing control.

In the case where the oncoming vehicle does not depart, or a following vehicle is detected after the departure of the oncoming vehicle has been confirmed, and then the interruption of the passing control is maintained, the steering and acceleration/deceleration control is performed such that the subject vehicle is decelerated and returned behind the preceding vehicle in the original traveling lane. In this case, the passing determination is made anew after the oncoming vehicle or following vehicle passes by.

The passing information output module 70 performs voice output or image output in order to present various types of information in the passing control to the driver. For example, voice guidance relating to the start of the passing operation, presence of the following vehicle, or the start of passing is output to the driver, and the driver is notified of the control contents corresponding to changes in conditions such as the interruption of passing due to the appearance of the oncoming vehicle or due to the detection of the following vehicle behind the oncoming vehicle, and the continuation of the passing control due to the departure of the oncoming vehicle.

Figure 3:
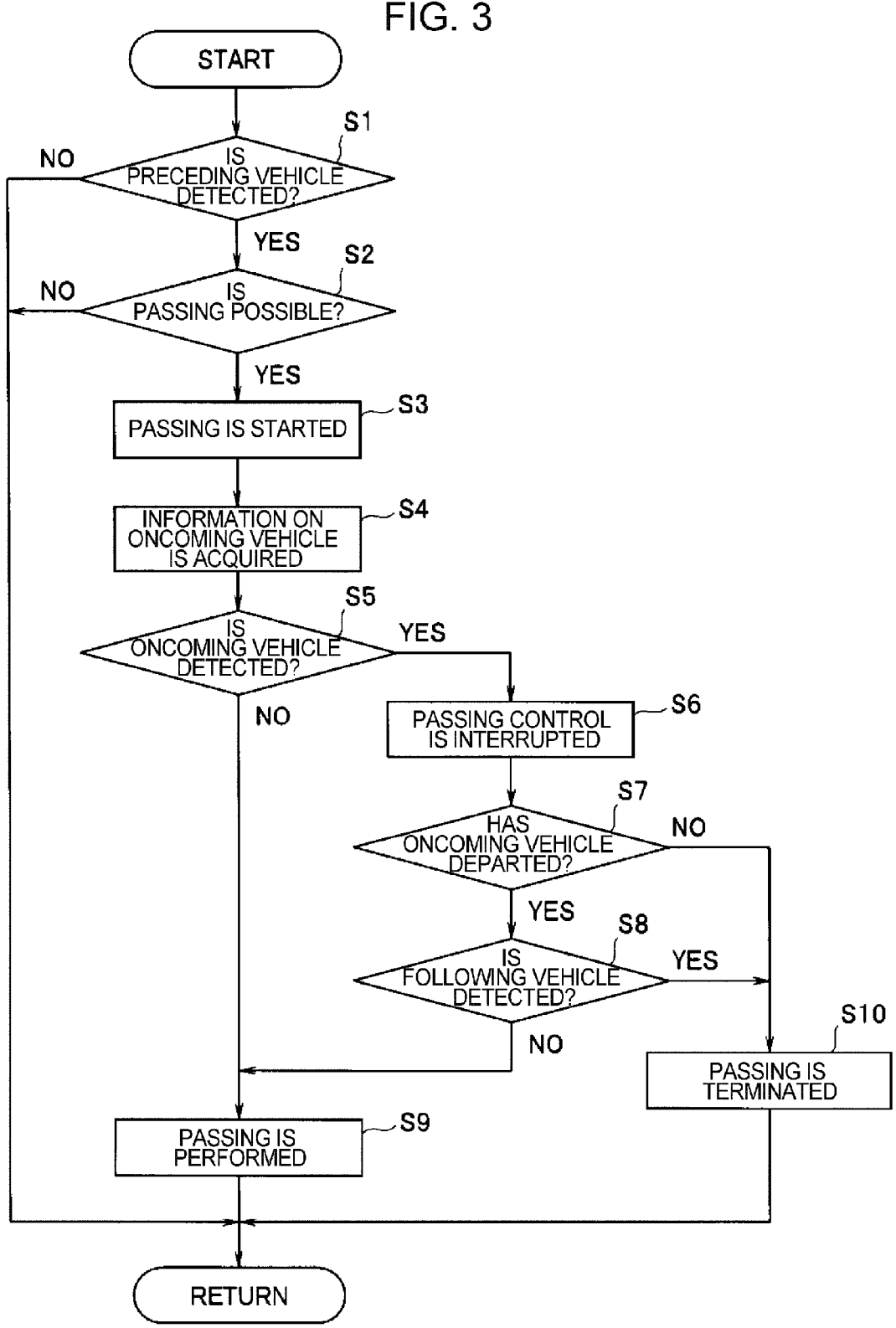
FIG. 3 is a flow chart of a passing control process.

The process in the driving support apparatus 2 that realizes the above-described passing control is described hereinbelow with reference to the flowchart depicted in FIG. 3.

In the passing control, firstly, in step S1, it is examined whether or not a preceding vehicle has been detected by the stereo camera unit 3. If a preceding vehicle has not been detected, the process exits the flow, and if a preceding vehicle has been detected, the process advances to step S2 to determine whether or not it is possible to pass the preceding vehicle on the basis of the traveling environment recognized from the outputs of the stereo camera unit 3, the side radar units 4, the rearward radar units 5, and the vehicle speed sensor 10.

If it is determined that the passing is possible, the process advances from step S2 to step S3 to instruct the automatic steering module 50 and the acceleration/deceleration control module 60 to start the passing control. In this case, the driver of the subject vehicle is notified, for example, with a voice output, of the start of the passing by the passing information output module 70, the turn light lamps are caused to blink with the automatic steering module 50 to notify the drivers of vehicles around the subject vehicle are that the subject vehicle has started the passing.

The process then advances to step S4 to accelerate the subject vehicle to move the subject vehicle into the oncoming lane through the power steering control performed by the automatic steering module 50 and the electronic throttle control performed by the acceleration/deceleration control module 60, and information on the oncoming lane is acquired from the oncoming lane status detection module 30 at a position (position A1 in FIG. 2) at which the subject vehicle crosses from the original traveling lane into the oncoming lane. In subsequent step S5, it is examined whether an oncoming vehicle has been detected, and. If an oncoming vehicle has not been detected, the process advances to step S9 to move the subject vehicle into the oncoming lane (position A3 in FIG. 2) by the automatic steering, and accelerate the subject vehicle with the electronic throttle control to pass the preceding vehicle. Once the subject vehicle passes the preceding vehicle and becomes at an adequate distance therefrom, the subject vehicle returns to the original traveling lane and moves in front of the preceding vehicle, whereby the passing control is completed.

Meanwhile, if an oncoming vehicle has been detected in step S5, the process advances from step S5 to step S6 where the passing control is interrupted, and the status of the oncoming vehicle is examined in step S7 onward. In step S7, it is examined whether or not the oncoming vehicle has departed, and if the departure is confirmed, it is examined in step S8 whether or not a following vehicle has been detected behind the oncoming vehicle.

When the departure of the oncoming vehicle has been confirmed and no following vehicle has been detected after the oncoming vehicle, the interruption of the passing control is canceled, and the process advances to step S9 to pass the preceding vehicle. When the departure of the oncoming vehicle is not confirmed, or the departure of the oncoming vehicle is confirmed but a following vehicle is detected behind the oncoming vehicle, the process advances to step S10 where the passing is terminated, and the subject vehicle is decelerated and returned to a position behind the preceding vehicle in the original traveling lane.

As described, in the example, when the subject vehicle is moved to the oncoming lane to pass the preceding vehicle, whether to interrupt or continue the passing is determined by appropriately recognizing the status of an oncoming vehicle traveling in the oncoming lane or a vehicle following the oncoming vehicle. As a result, the passing can be appropriately terminated or completed according to the change in conditions after the passing has been started, and no anxiety is given to the driver.

The invention claimed is:

1. A driving support apparatus for a vehicle that determines whether or not the vehicle can pass a preceding vehicle traveling in front of the vehicle and executes passing control relating to the preceding vehicle when the passing is possible, the driving support apparatus comprising:

an oncoming lane status detection module that detects a status of at least one vehicle traveling in an oncoming lane when the vehicle moves to the oncoming lane and the passing control relating to the preceding vehicle is started; and a passing control interruption determination module that interrupts the passing control relating to the preceding vehicle when an oncoming vehicle is detected by the oncoming lane status detection module and determines whether to continue the passing control relating to the preceding vehicle or to maintain the interruption according to the status of the at least one vehicle traveling in the oncoming lane, wherein upon detecting an oncoming vehicle traveling in the oncoming lane, the oncoming lane status detection module calculates a lateral position of the oncoming vehicle, and the passing control interruption determination module determines a departure of the oncoming vehicle from the oncoming lane by comparing a departure determination value that is based on the lateral position of the oncoming vehicle with a threshold, cancels the interruption of the passing control when the departure of the oncoming vehicle is determined and a vehicle following the oncoming vehicle is not detected, while maintaining the interruption of the passing control when the departure of the oncoming vehicle is determined, but a vehicle following the oncoming vehicle is detected.

2. The driving support apparatus for a vehicle according to claim 1, wherein the departure determination value is either one of a lateral speed and a lateral acceleration that are calculated from the lateral position of the oncoming vehicle.

3. The driving support apparatus for a vehicle according to claim 2, wherein the threshold is variably changed according to a degree of change in the vehicle speed or a relationship between a speed and a speed limit of the vehicle.

4. The driving support apparatus for a vehicle according to claim 3, wherein the threshold is decreased when an operation of a turn signal lamp of the oncoming vehicle is confirmed.

5. The driving support apparatus for a vehicle according to claim 2, wherein the threshold is decreased when an operation of a turn signal lamp of the oncoming vehicle is confirmed.

6. The driving support apparatus for a vehicle according to claim 1, wherein the departure determination value is either one of a yaw angle and a yaw rate that are calculated from the lateral position of the oncoming vehicle.

7. The driving support apparatus for a vehicle according to claim 6 wherein the threshold is variably changed according to a degree of change in the vehicle speed or a relationship between a speed and a speed limit of the vehicle.

8. The driving support apparatus for a vehicle according to claim 7, wherein the threshold is decreased when an operation of a turn signal lamp of the oncoming vehicle is confirmed.

9. The driving support apparatus for a vehicle according to claim 6 wherein the threshold is decreased when an operation of a turn signal lamp of the oncoming vehicle is confirmed.

10. The driving support apparatus for a vehicle according to claim 1, wherein the threshold is variably changed according to a degree of change in the vehicle speed or a relationship between a speed and a speed limit of the vehicle.

11. The driving support apparatus for a vehicle according to claim 10, wherein the threshold is decreased when an operation of a turn signal lamp of the oncoming vehicle is confirmed.

12. The driving support apparatus for a vehicle according to claim 1, wherein the threshold is decreased when an operation of a turn signal lamp of the oncoming vehicle is confirmed.

* * * * *